(12) United States Patent
Andou et al.

(10) Patent No.: US 7,927,647 B2
(45) Date of Patent: Apr. 19, 2011

(54) PLASTIC FAT COMPOSITION

(75) Inventors: Masataka Andou, Kanagawa (JP);
Yoshiyuki Hatano, Kanagawa (JP);
Takuya Ozawa, Kanagawa (JP);
Masako Shimada, Kanagawa (JP);
Hirofumi Haruna, Kanagawa (JP)

(73) Assignee: The Nisshin OilliO Group, Ltd., Tokyo (JP)

( * ) Notice: Subject to any disclaimer, the term of this patent is extended or adjusted under 35 U.S.C. 154(b) by 0 days.

(21) Appl. No.: 12/668,104

(22) PCT Filed: Jul. 7, 2008

(86) PCT No.: PCT/JP2008/062289
§ 371 (c)(1),
(2), (4) Date: Jan. 7, 2010

(87) PCT Pub. No.: WO2009/008410
PCT Pub. Date: Jan. 15, 2009

(65) Prior Publication Data
US 2010/0291283 A1    Nov. 18, 2010

(30) Foreign Application Priority Data
Jul. 10, 2007  (JP) ................. 2007-181334

(51) Int. Cl.
*A23D 7/00* (2006.01)

(52) U.S. Cl. ........................ 426/606; 426/607

(58) Field of Classification Search ............. 426/606, 426/607, 602–604
See application file for complete search history.

(56) References Cited

U.S. PATENT DOCUMENTS

| | | | | |
|---|---|---|---|---|
| 3,889,005 A * | 6/1975 | Brammer et al. | .......... | 426/585 |
| 4,396,639 A * | 8/1983 | Bodor et al. | .......... | 426/603 |
| 4,610,889 A * | 9/1986 | Schmidt | .......... | 426/602 |
| 6,277,433 B1 * | 8/2001 | Lantz et al. | .......... | 426/606 |
| 7,611,744 B2 * | 11/2009 | Cain et al. | .......... | 426/606 |
| 7,794,773 B2 * | 9/2010 | Cain et al. | .......... | 426/606 |

FOREIGN PATENT DOCUMENTS

| | | |
|---|---|---|
| JP | S54-31407 | 3/1979 |
| JP | S55-110195 | 8/1980 |
| JP | S57-74041 | 5/1982 |
| JP | S62-205738 | 9/1987 |
| JP | H2-219581 | 9/1990 |
| JP | H8-242765 | 9/1996 |
| JP | H10-183165 | 7/1998 |
| JP | 2007-124948 | 5/2007 |
| WO | WO-2006/059592 | 6/2006 |

OTHER PUBLICATIONS

Ong, A. S. 1982. Korean J. Food Sci. Technol. 14(2)187.*
Swern, D. 1979. Bailey's Industrial Oil and Fat Products, vol. 1, 4th edition. John Wiley & Sons, New York. p. 194, 195, 315, 317, 374, 375, 377, 429, 430, 431 & 432.*
Gunstone, F. D. 1983. Lipids in Foods. Chemistry, Biochemistry and Technology. Pergamon Press. New York, NY. p. 152-154.*

* cited by examiner

*Primary Examiner* — Carolyn A Paden
(74) *Attorney, Agent, or Firm* — Muncy, Geissler, Olds & Lowe, PLLC

(57) ABSTRACT

A plastic fat composition to be used mainly as a margarine or shortening having a low content of trans fatty acids, and superior qualities without generating coarse crystals and the like even though a large amount of palm-based fats are blended is provided. A plastic fat composition containing: fat A that is a palm-based fat having an iodine value of no greater than 62; fat B that is a transesterified oil containing 20 to 60% by mass of a saturated fatty acid having 12 to 14 carbon atoms, and 40 to 80% by mass of a saturated fatty acid having 16 to 18 carbon atoms based on the total fatty acids constituting the fat B; and fat C that is a vegetable oil other than the fat A, the fat C having a melting point of no higher than 25° C., wherein the fat A, the fat B and the fat C are in an oil phase, the ratio of the content of the fat A to the content of the fat B (fat A/fat B) ranges from 0.5 to 5.5, and the oil phase contains 4.5 to 10.5% by mass of a trisaturated triglyceride constituted only with a saturated fatty acid having 16 or more carbon atoms.

8 Claims, No Drawings

PLASTIC FAT COMPOSITION

TECHNICAL FIELD

The present invention relates to a plastic fat composition which can be suitably used in the production of margarine, shortening and the like and which is less likely to cause quality deterioration such as roughening of the texture of the margarine, the shortening and the like, and coarsening of crystals even though palm-based fats are blended.

BACKGROUND ART

Conventionally, as raw fat materials for plastic fat compositions such as margarines, shortenings and the like (hereinafter, abbreviated as M/S), partially hydrogenated oils of vegetable/animal fats, i.e., so called hydrogenated oils, have been commonly used. However, in recent years it has been elucidated that trans fatty acids which are produced in a hydrogenation reaction and are included in hydrogenated oils may increase the risk of cardiac diseases and the like, and thus demands for M/S from which trans fatty acids are eliminated to as less as possible have rapidly increased.

In order to reduce the trans fatty acid level in M/S, candidates for fats that can be an alternative of hydrogenated oils are significantly limited, and have been restricted to palm oils in effect. Although palm oils are effective in maintaining the hardness of M/S since they are present in the form of a semisolid or a solid at ordinary temperatures, on the other hand, when they are used as a raw fat material of M/S, they are problematic in that roughening of the texture and formation of crystals of coarse particles (coarse crystals) may be caused during storage of the product, thereby resulting in deterioration of appearance and physical properties of the product, and roughness of the texture.

With respect to the aforementioned coarse crystals generated in M/S produced using a palm oil, POP (1,3-dipalmitoyl-2-oleoylglycerol) that is a major triglyceride of the palm oil corresponds to the major constitutive component of the coarse crystals; therefore, reforming processes by transesterification aiming at reduction of the POP content have been conventionally investigated in attempts to reform a palm oil except for hydrogenation (for example, see Patent Documents 1 to 3). In addition, processes for precluding coarse crystals by adding a certain emulsifying agent have been also investigated (for example, see Patent Documents 4 and 5).

In the case of reforming by transesterification of a palm oil as disclosed in Patent Documents 1 to 3, the POP content can be significantly reduced to improve the crystallinity according to a reaction in which sodium methoxide is used as a catalyst. However, a problem of inferior melt-in-the-mouth may be caused as indicated by a curve drawn by plotting the solid fat content (hereinafter, referred to as "SFC") with respect to the temperature approximating a horizontal curve. In addition, according to transesterification by lipase specific for 1,3-position, the POP content cannot be significantly reduced, and thus the effect of reforming crystallinity cannot be achieved satisfactorily.

In the processes for precluding coarse crystals of a palm oil by adding an emulsifying agent disclosed in Patent Documents 4 and 5, a comparatively large amount of emulsifying agent must be added in order to achieve the effect of precluding the coarse crystals. Therefore, an unpleasant flavor of the emulsifying agent that affects the M/S product can be disadvantageous.

Therefore, development of techniques for reforming the crystallinity of palm oils which can directly take advantages of features of the palm oils (favorable melt-in-the-mouth, and plain flavor) has been desired.

Patent Document 1: Japanese Unexamined Patent Application, First Publication No. S55-110195
Patent Document 2: Japanese Unexamined Patent Application, First Publication No. H02-219581
Patent Document 3: Japanese Unexamined Patent Application, First Publication No. H10-183165
Patent Document 4: Japanese Unexamined Patent Application, First Publication No. S62-205738
Patent Document 5: Japanese Unexamined Patent Application, First Publication No. 2007-124948

DISCLOSURE OF THE INVENTION

Problems to be Solved by the Invention

Therefore, an object of the present invention is to provide a plastic fat composition having a low content of trans fatty acids, which does not cause roughening of texture and formation of crystals of coarse particles (coarse crystals) during storage of the product, irrespective of use of a palm oil as a raw fat material of a plastic fat composition such as M/S, while taking advantages of features of the palm oil (favorable melt-in-the-mouth, plain flavor and the like).

Means for Solving the Problems

The present inventors thoroughly investigated in order to solve the aforementioned problems, and consequently found that plasticity appropriate for M/S can be achieved by mixing a palm-based fat and a certain transesterified oil, such that the proportion of the palm-based fat with respect to the transesterified oil is 0.5 to 5.5, and further blending a certain amount of a liquid oil therein. Accordingly, the present invention was completed.

More specifically, the present invention provides a plastic fat composition containing: fat A that is a palm-based fat having an iodine value of no greater than 62; fat B that is a transesterified oil containing 20 to 60% by mass of a saturated fatty acid having 12 to 14 carbon atoms, and 40 to 80% by mass of a saturated fatty acid having 16 to 18 carbon atoms based on the total fatty acids constituting the fat B; and fat C that is a vegetable oil other than the fat A, the fat C having a melting point of no higher than 25° C., in which the fat A, the fat B and the fat C are in an oil phase, the ratio of the content of the fat A to the content of the fat B (fat A/fat B) ranges from 0.5 to 5.5, and the oil phase contains 4.5 to 10.5% by mass of a trisaturated triglyceride constituted only with a saturated fatty acid having 16 or more carbon atoms.

Effects of the Invention

According to the present invention, a plastic fat composition having a low content of trans fatty acids which does not cause roughening of texture and formation of crystals of coarse particles (coarse crystals) during storage of the product even though a palm oil is used as a raw fat material of the plastic fat composition such as M/S, and which takes advantages of features of the palm oil (favorable melt-in-the-mouth, plain flavor) can be provided.

PREFERRED MODE FOR CARRYING OUT THE INVENTION

Hereinafter, the plastic fat composition of the present invention is explained in detail. The plastic fat composition of the present invention contains fat A, fat B and fat C in an oil phase.

The fat A that is one of the constitutive components of the present invention is a palm-based fat having an iodine value of no greater than 62. The palm-based fat referred to herein may be any one as long as it is involved in palm oils and palm fractionated oils, and specific examples include palm olein and palm stearin that are first-stage fractionated oils, palm olein (palm super olein) and palm mid fractions that are second-stage fractionated oils of palm olein, and palm olein (soft palm) and palm stearin (hard stearin) that are second-stage fractionated oils of palm stearin, and the like. The method for fractionating a palm oil is not particularly limited, and any of methods of solvent fractionation, dry fractionation, and emulsification fractionation may be employed.

By using the palm-based fat having an iodine value of no greater than 62 as the fat A, the hardness of M/S can be maintained appropriately, and the melt-in-the-mouth can be improved.

Any mixture of two or more of these palm oils and palm fractionated oils may be used as the palm-based fat for use in the fat A. In addition, the palm-based fat for use in the fat A preferably has the content of the trisaturated triglyceride constituted only with the saturated fatty acid having 16 or more carbon atoms being no greater than 9% by mass. When the content of the trisaturated triglyceride constituted only with the saturated fatty acid having 16 or more carbon atoms in the palm-based fat for use in the fat A is no greater than 9% by mass, the content of the fat A (palm-based fat) in the oil phase can be increased.

It should be noted that the content of the trisaturated triglyceride constituted only with the saturated fatty acid having 16 or more carbon atoms in the fat may be determined according to a method in JAOCS, vol. 70, 11, 1111-1114 (1993).

The content of the fat A in the oil phase is preferably 20 to 70% by mass, and more preferably 30 to 60% by mass.

By setting the content of the fat A in the oil phase of 20 to 70% by mass, the solid fat content of M/S produced using the plastic fat composition of the present invention becomes suitable, and thus the hardness of the M/S can be kept appropriately. In addition, blendable fats other than the palm-based fat can be increased, thereby enabling the adjustment of physical properties as needed.

The fat B that is one of constitutive components of the present invention is a transesterified oil containing 20 to 60% by mass, preferably 25 to 40% by mass, and still more preferably 28 to 35% by mass of a saturated fatty acid having to 14 carbon atoms, and containing 40 to 80% by mass, preferably 46 to 70% by mass, and still more preferably 52 to 68% by mass of a saturated fatty acid having 16 to 18 carbon atoms, based on the total fatty acids constituting the fat B. The fat B may contain other fatty acid as in the range to allow the saturated fatty acid having 12 to 14 carbon atoms and the saturated fatty acid having 16 to 18 carbon atoms to fall within the above range.

As the fat B, transesterified oils of a lauric fat with a highly hydrogenated oil of a plant fat that is rich in fatty acids having 16 to 18 carbon atoms (rape seed oil, soybean oil, palm oil, etc.), and in particular, transesterified oils of a lauric fat with a palm-based fat can be specifically exemplified. Herein, the lauric fat refers to a fat including 30% by mass or more lauric acid in the constitutive fatty acids of the fat, and specifically, coconut oil, palm kernel oil, fractionated oils thereof and the like may be exemplified. As the lauric fat in the present invention, any one of these may be used, or two or more of them may be used by mixing arbitrarily. The palm-based fats are as explained above.

When the composition and the content of the fatty acid that constitutes the fat B are out of the above range, the resulting plastic fat composition cannot retain favorable crystallinity of the fat, and thus roughening of the texture and coarsening of the fat crystals are likely to occur. In addition, when the fat B is not subjected to a transesterification treatment, plasticity appropriate for roll-in use is not achieved since extremely hard physical properties are brought, and also the melt-in-the-mouth may be significantly inferior. It should be noted that the analysis of the constitutive fatty acids in the fats may be carried out according to AOCS Celf-96.

In one preferred embodiment, the fat B which may be exemplified as one of constitutive components of the present invention is obtained by transesterifying a mixture of a palm kernel oil or a fractionated oil thereof with a palm-based fat at a ratio of from 30:70 to 70:30, and thereafter hydrogenating until the iodine value becomes no greater than 10. In this case, the palm kernel oil or the fractionated oil thereof, and the palm-based fat may be first separately hydrogenated, respectively, and thereafter mixed such that the iodine value becomes no greater than 10 at a mixing ratio of 30:70 to 70:30, followed by transesterification finally. In other words, either transesterification or hydrogenation may be carried out in advance in producing the fat B.

The iodine value of the fat B is preferably no greater than 10, more preferably no greater than 5, and most preferably no greater than 2 in terms of sufficient reduction of the content of the trans fatty acids. The hydrogenation method is also not particularly limited, and, for example, may be carried out under a nickel catalyst, and conditions of a hydrogen pressure of 0.02 to 0.3 MPa, at 160 to 200° C.

In another preferred embodiment, the fat B which may be exemplified as one of constitutive components of the present invention is obtained by transesterifying a lauric fat having an iodine value of no greater than 10 with a palm-based fat having an iodine value of no greater than 20.

The lauric fat having an iodine value of no greater than 10 include, for example, fractionated stearin portions of palm kernel oils. The fractionated stearin portion of palm kernel oil has an iodine value of preferably no greater than 10, and more preferably no greater than 7.

The palm-based fat having an iodine value of no greater than 20 include fractionated stearin portions of palm oils. As the fractionated stearin portions of palm oils, second-stage fractionated stearin (hard stearin) obtained by further fractionating palm stearin provided by first-stage fractionation of palm oil is preferred. The fractionated stearin portions of palm oils preferably have an iodine value of no greater than 20, more preferably no greater than 16, and most preferably no greater than 13.

When the lauric fat has an iodine value of no less than 10, or when the palm-based fat has an iodine value of no less than 20, the effect of improving crystallinity of the resulting transesterified oil (fat B) to the palm-based fat (fat A) may be inferior.

As the fat B, a transesterified mixture of fractionated stearin of palm kernel oil having an iodine value of no greater than 10 and palm stearin having an iodine value of no greater than 20 at a mixing ratio of 30:70 to 70:30, mixed to have an iodine value of no greater than 17.

The method of transesterification for producing the fat B that is one of the constitutive components of the present invention is not particularly limited, and any of chemical transesterification using a synthetic catalyst, and enzymatic transesterification using lipase as a catalyst may be employed.

For the chemical transesterification, a transesterification reaction is permitted using a chemical catalyst such as sodium methoxide. The transesterification reaction by chemical transesterification will be a transesterification reaction that is inferior in position specificity (also referred to as random transesterification).

The chemical transesterification may be carried out, for example, according to a common procedure, by sufficiently drying the raw fat material, adding a catalyst to the raw fat material in an amount of 0.1 to 1% by mass, and thereafter the reaction is permitted under reduced pressure, at 80 to 120° C. for 0.5 to 1 hour while stirring. After completing the transesterification reaction, the catalyst is washed away with water, and thereafter decolorization and deodorization treatments may be carried out which are employed in common purification steps of cooking oil.

For the enzymatic transesterification, a transesterification reaction is permitted using lipase as a catalyst.

As the lipase, lipase powder, or an immobilized lipase in which lipase powder is immobilized in a carrier such as Celite or an ion exchange resin can be used. The transesterification reaction by enzymatic transesterification may be carried out with either a transesterification reaction that is poor in position specificity, or a transesterification reaction that is superior in 1,3-position specificity, depending on the type of the lipase.

Examples of the lipase capable of carrying out the transesterification reaction that is poor in position specificity include lipase derived from genus *Alcaligenes* (e.g., lipase QLM, lipase PL, etc., manufactured by Meito Sangyo Co., Ltd.), lipase derived from genus *Candida* (e.g., lipase OF, etc., manufactured by Meito Sangyo Co., Ltd.), and the like.

Examples of the lipase capable of carrying out the transesterification reaction that is superior in 1,3-position specificity include immobilized lipase derived from *Rhizomucor miehei* (Lipozyme TLIM, Lipozyme RMIM etc., manufactured by Novozymes), and the like.

The enzymatic transesterification may be carried out by, for example, adding lipase powder or immobilized lipase to a raw fat material in an amount of 0.02 to 10% by mass, and preferably 0.04 to 5% by mass, and thereafter permitting the reaction at 40 to 80° C., and preferably 40 to 70° C. for 0.5 to 48 hrs, and preferably 0.5 to 24 hrs while stirring. After completing the transesterification reaction, lipase powder or immobilized lipase is removed by filtration or the like, and thereafter decolorization and deodorization treatments may be carried out which are employed in common purification steps of cooking oil.

The content of the trisaturated triglyceride constituted only with the saturated fatty acid having 16 or more carbon atoms in the fat of the fat B that is a transesterified oil can be calculated according to a well known method in the art, when the analysis by any of methods of solvent fractionation, dry fractionation, and emulsification fractionation is difficult since the transesterified oil contains lauric fat in the raw oil material, for example, on the basis of the entire fatty acid composition and the 2-position fatty acid composition of the triglyceride constituting the fat. With respect to details, reference may be made to Review by R. J. VANDER WAL (JAOCS, vol. 40, 242-247 (1963)). It should be noted that the analysis of the entire fatty acid composition may be carried out according to AOCS Celf-96, and the analysis of the 2-position fatty acid composition may be carried out according to AOCS Ch3-91. Further, the iodine value can be determined according to a method of "JAPAN Oil Chemists' Society, Standard Test Method for Analysis of Fats and Oils, 2.3.4.1-1996".

With respect to the mixing ratio of the fat A that is one of the constitutive components of the present invention and the fat B that is one of the constitutive components of the present invention, the ratio of the content of the fat A to the content of the fat B (fat A/fat B) is preferably 0.5 to 5.5, more preferably 1.0 to 5.0, and most preferably 1.5 to 4.5. When the mixing ratio of the fat A and the fat B falls within the above range, the effect of improving the crystallinity of the fat B (transesterified oil) to the fat A (palm-based fat) can be efficiently exhibited. When the mixing ratio is less than 0.5, the amount of the fat A (palm-based fat) blended in the fat composition of the present invention is limited to small, and thus the features of the fat A (palm-based fat), i.e., favorable melt-in-the-mouth and plain flavor cannot be exhibited. When the mixing ratio is greater than 5.5, coarsening of the fat crystals derived from the palm-based fat may not be effectively suppressed.

The content of the fat B in the oil phase is preferably 8 to 50% by mass, and more preferably 12 to 40% by mass.

By setting the content of the fat B in the oil phase to be 8 to 50% by mass, the solid fat content of M/S produced using the plastic fat composition of the present invention may be suitable, and the hardness of M/S can be more easily maintained and also favorable plasticity can be achieved.

The fat C that is one of the constitutive components of the present invention is a vegetable oil other than the fat A, which has a melting point of no higher than 25° C. As the fat C, for example, a vegetable oil that is in a liquid form at 5° C. may be used. In addition, as the fat C, a mixed oil of a vegetable oil that is in a liquid form at 5° C., and one or two more selected from a stearin portion or lauric fat obtained in the fractionation step for obtaining the vegetable oil that is in a liquid form at 5° C. can be used.

Examples of the vegetable oil that is in a liquid form at 5° C. include a type of cooking oils, and specific examples include rape seed oil, olive oil, rice oil, sesame oil, cotton seed oil, peanut oil, corn oil, soybean oil, sunflower oil, safflower oil, or mixed oil of these, and the like. Furthermore, fractionated oils such as palm olein (palm super olein) having an iodine value greater than 62, and the like may be also exemplified, but not limited to the aforementioned fats. Also, the stearin portion obtained in the fractionation step for obtaining the vegetable oil that is in a liquid form at 5° C. is more specifically, cotton seed oil stearin, rice oil stearin, and the like. Furthermore, as the lauric fat, similar ones to those described above may be used.

To use as the fat C a mixed fat of a vegetable oil that is in a liquid form at 5° C., and a stearin portion and/or a lauric fat obtained in the fractionation step for obtaining the vegetable oil that is in a liquid form at 5° C. is preferred since the obtained plastic fat composition has favorable melt-in-the-mouth.

It should be noted that with respect to the method for measuring the melting point of the fat, "JAPAN Oil Chemists' Society, Standard Test Method for Analysis of Fats and Oils, 2.2.4.2 (1996)" may be referred to.

The content of the fat C in the oil phase is preferably 10 to 60% by mass, more preferably 15 to 55% by mass, and most preferably 20 to 50% by mass.

By setting the content of the fat C in the oil phase to be 10 to 60% by mass, plasticity of the resulting plastic fat composition can be kept favorable, and progress of coarsening of the fat crystals derived from the fat A (palm-based fat) can be prevented.

In the plastic fat composition of the present invention, it is necessary that the content of the trisaturated triglyceride constituted only with the saturated fatty acid having 16 or more carbon atoms in the oil phase yielded by mixing the fat A, fat B, fat C under the aforementioned conditions is 4.5 to 10.5% by mass, and the content is preferably 5 to 10% by mass. When the content of the trisaturated triglyceride constituted only with the saturated fatty acid having 16 or more carbon atoms in the oil phase is less than 4.5% by mass, sufficient crystallization rate is not attained in production of the plastic fat composition, and roughening of the texture and coarsening of the fat crystals are likely to occur during storage of the plastic fat composition. When the content of the trisaturated triglyceride constituted only with the saturated fatty acid having 16 or more carbon atoms in the oil phase is greater than 10.5% by mass, the melt-in-the-mouth of the plastic fat composition may be inferior, and the plastic fat composition becomes excessively hard.

In addition, it is preferred that the plastic fat composition of the present invention does not substantially contain a trans fatty acid. Although hydrogenation is a typical method for elevating the melting point of the fat, the hydrogenated fat obtained thereby usually contains approximately 10 to 50% by mass of trans fatty acids in the constitutive fatty acid, except for completely hydrogenated fats. On the other hand, the trans fatty acids are scarcely present in natural fats, and they are merely included in less than 10% by mass in fats derived from ruminant, except for a slight amount present in purified oils due to exposure to a high temperature in the deodorization step carried out in the purification step of fats. In recent years, influences of excessive consumption of trans fatty acid on health have been regarded as a problem, and M/S in which a plastic fat composition not substantially containing trans fatty acids has been demanded.

The phrase "not substantially containing trans fatty acids" herein means that the content of trans fatty acids in the plastic fat composition of the present invention is preferably less than 5% by mass, more preferably less than 3% by mass, and most preferably less than 2% by mass.

Although a hydrogenated fat is used as the fat B in the plastic fat composition of the present invention, when the fat B is an almost completely hydrogenated fat having an iodine value of 0 to 2, it does not substantially contain trans fatty acids. In addition, used of hydrogenated fat is excluded from other fat A and fat C. Therefore, a plastic fat composition not substantially containing trans fatty acids can be obtained according to the present invention. It should be noted that the analysis of the trans fatty acid content in the fat can be performed in accordance with AOCS Celf-96.

The plastic fat composition of the present invention may include a fat other than the fat A, the fat B and the fat C in the oil phase in the range not to deteriorate the object of the present invention. The amount of the other fat blended in the oil phase is preferably no greater than 35% by mass, and more preferably no greater than 20% by mass. Exemplary other fat is milk fat and the like.

The plastic fat composition of the present invention has a content of the oil phase of preferably 60 to 100% by mass, and more preferably 80 to 98% by mass, while has the content of the aqueous phase of preferably 0 to 40% by mass, and more preferably 2 to 20% by mass. In general, when an aqueous phase is absent, the composition is referred to as a shortening, while a margarine does include an aqueous phase. When the content of the oil phase and the aqueous phase falls within the above range, the resulting plastic fat composition can retain its emulsification state more favorably.

The plastic fat composition of the present invention may contain a component other than those described in the foregoing. Examples of the other component include an emulsifying agent, a thickening stabilizer, a salting agent such as common salts and potassium chloride, an acidulant such as acetic acid, lactic acid and gluconic acid, a sweetener such as saccharide, sugar alcohols, stevia and aspartame, a colorant such as β-carotene, caramel and monascus color, an antioxidant such as tocopherol and tea extract, a plant protein such as wheat protein and soybean protein, egg and various egg processed egg product, a flavor, a milk product, a seasoning, a pH adjusting agent, a food preservative, and an ingredient for foods or a food additive such as fruit, fruit juice, coffee, nuts paste, spices, cocoa mass, cocoa powder, grain, beans, vegetables, meats and fish and shellfish, and the like.

Examples of the emulsifying agent include synthetic emulsifying agents such as polyglycerin fatty acid esters, sucrose fatty acid esters, sorbitan fatty acid esters, polysorbate, condensed ricinoleic fatty acid esters and glyceride esters, as well as emulsifying agents other than synthetic agents such as soybean lecithin, egg yolk lecithin, soybean lysolecithin, egg yolk lysolecithin, enzyme-treated egg yolk, saponin, plant sterols and milk fat globule membrane, and the like.

Examples of the thickening stabilizer include guar gum, locust bean gum, carrageen, gum arabic, alginic acids, pectin, xanthan gum, pullulan, tamarind seed gum, psyllium seed gum, crystal cellulose, carboxymethyl cellulose, methyl cellulose, agar, glucomannan, gelatin, starch, processed starch, and the like.

In the plastic fat composition of the present invention, the content of the described above other component is preferably no greater than 10% by mass, and more preferably no greater than 5% by mass.

Next, a method for producing the plastic fat composition of the present invention will be explained.

The method for producing the plastic fat composition of the present invention is not particularly limited, and can be obtained by lysing the oil phase containing the fat A, the fat B and the fat C, and cooling the mixture to permit crystallization. Specifically, the oil phase is first lysed, and the aqueous phase is mixed to permit emulsification as needed. Then, to carry out a sterilization process is desired. The sterilization process may be either of batch wise in a tank, or continuous using a plate type heat exchanger or a scraped surface heat exchanger.

Next, cooling is carried out to permit crystallization. Preferably, cooling is carried out to permit plasticization. The cooling conditions involve preferably no less than −0.5° C./min, and more preferably no less than −5° C./min. In this step, it is more preferred to carry out the cooling quickly than gradually. The cooling may be carried out with a cooling system which may be a sealed continuous tubular cooling device, for example, margarine manufacturing machines such as Votator, Combinator, and Perfector, a plate type heat exchanger or the like. Alternatively, any combination of an open type "DiaCooler" with "Complector" may be employed.

Since the plastic fat composition of the present invention does not substantially contain trans fatty acids as described above, it can be used as a raw fat material of a margarine or a shortening.

When a margarine is produced as the plastic fat composition of the present invention, its emulsification state may be any one of water-in-oil type, oil-in-water type, and double emulsifying type.

The plastic fat composition of the present invention can be suitably used as a margarine or a shortening. In addition, since the margarine or the shortening produced using the plastic fat composition of the present invention exhibits favorable plasticity in a wide temperature range, it can be particularly suitable used in kneading of dought for producing confectioneries and breads. Examples of the foods in which the margarine of the present invention is used include breads such as white loaf bread, sweetened buns, crescent rolls and Danish pastries, baked confectioneries such as cookies, biscuits, cakes and pies, and the like.

Examples of the foods in which the shortening of the present invention is used include breads such as white loaf bread, sweetened buns, crescent rolls and Danish pastries, baked confectioneries such as cookies, biscuits, cakes and pies, and the like.

EXAMPLES

Next, the present invention is explained in more detail by way of Examples and Comparative Example, but the present invention is not any how limited thereto.

Preparation of Fat A, Fat B and Fat C: 1

Palm oil (A-1) was used as fat A, and transesterified oils (B-1, B-2 and B-3) as described below were prepared as fat B. In addition, as a fat blended in place of the fat B for comparison, palm highly hydrogenated oil (b-1), or soybean highly hydrogenated oil (b-2) was used. As the fat C, rape seed oil (C-1) or palm super olein (C-2) was used. Compositions of fat A-1, fat B-1 to B-3, fat b-1, b-2, fat C-1, and fat C-2 are shown in Table 1 below.

Fat A-1: Palm Oil (trade name: Purified Palm Oil, manufactured by Nisshin OilliO Group, Ltd.)

Fat B-1: prepared by mixing a palm kernel highly hydrogenated oil (iodine value: less than 1; manufactured by Nisshin OilliO Group, Ltd., in-company) and a palm highly hydrogenated oil (trade name: Palm Highly Hydrogenated Oil; iodine value: less than 2; manufactured by Yokozeki Oil & Fat Ind. Co., Ltd.) at a ratio of 1:1, subjecting to random transesterification using sodium methoxide as a catalyst, followed by purification with a common procedure.

Fat B-2: prepared by mixing a palm kernel highly hydrogenated oil (iodine value: less than 1; manufactured by Nisshin OilliO Group, Ltd., in-company) and second-stage fractionated palm stearin (iodine value: 13; manufactured by Nisshin OilliO Group, Ltd., in-company) at a ratio of 6:4, subjecting to random transesterification using sodium methoxide as a catalyst, followed by purification with a common procedure.

Fat B-3: prepared by mixing a palm kernel highly hydrogenated oil (iodine value: less than 1; manufactured by Nisshin OilliO Group, Ltd., in-company) and second-stage fractionated palm stearin (iodine value: 13; manufactured by Nisshin OilliO Group, Ltd., in-company) at a ratio of 3:7, subjecting to random transesterification using sodium methoxide as a catalyst, followed by purification with a common procedure.

Fat b-1: a palm highly hydrogenated oil (trade name: Palm Highly Hydrogenated Oil, iodine value: less than 2, manufactured by Yokozeki Oil & Fat Ind. Co., Ltd.)

Fat b-2: a soybean highly hydrogenated oil (trade name: Soybean Highly Hydrogenated Oil, iodine value: less than 2; manufactured by Yokozeki Oil & Fat Ind. Co., Ltd.)

Fat C-1: Rape Seed Oil (trade name: Refined Rape Seed Oil, manufactured by Nisshin OilliO Group, Ltd.), melting point: lower than 5° C. (unmeasurable since it is not hardened, lower than 5° C. at least, since it is transparent at 5° C.)

Fat C-2: palm super olein (iodine value: 65; manufactured by Nisshin OilliO Group, Ltd.), melting point: 8° C.

Preparation of Test Fat: 1

Example 1

A fat was prepared by mixing the fat A-1, the fat B-1 and the fat C-1 at a ratio of 50:30:20.

Example 2

A fat was prepared by mixing the fat A-1, the fat B-1 and the fat C-1 at a ratio of 50:20:30.

Example 3

A fat was prepared by mixing the fat A-1, the fat B-1 and the fat C-1 at a ratio of 50:10:40.

Example 4

A fat was prepared by mixing the fat A-1, the fat B-2 and the fat C-1 at a ratio of 50:10:40.

Example 5

A fat was prepared by mixing the fat A-1, the fat B-3 and the fat C-1 at a ratio of 50:10:40.

Example 6

A fat was prepared by mixing the fat A-1, the fat B-1 and the fat C-2 at a ratio of 50:20:30.

Comparative Example 1

A fat was prepared by mixing the fat A-1, the fat B-1 and the fat C-1 at a ratio of 50:5:45.

Comparative Example 2

A fat was prepared by mixing the fat A-1, the fat b-1 and the fat C-1 at a ratio of 50:10:40.

Comparative Example 3

A fat was prepared by mixing the fat A-1, the fat b-2 and the fat C-1 at a ratio of 50:10:40.

Comparative Example 4

A fat was prepared by mixing the fat A-1 and the fat C-1 at a ratio of 50:50.

With respect to Example 1 to Example 6, and Comparative Example 1 to Comparative Example 4, blend proportions of

TABLE 1

| | fat A-1 | fat B-1 | fat B-2 | fat B-3 | fat b-1 | fat b-2 | fat C-1 | fat C-2 |
|---|---|---|---|---|---|---|---|---|
| | | | | | | | (unit: % by mass) | |
| Iodine value | 52.4 | 0.8 | 5.5 | 9.4 | 0.7 | 0.5 | 116.3 | 65.0 |
| Content of C12 and C14 saturated fatty acids | 1.4% | 30.8% | 38.6% | 20.4% | 1.4% | 0.1% | 0.0% | 1.3% |
| Content of C16 and C18 saturated fatty acids | 48.6% | 65.4% | 51.7% | 68.4% | 97.7% | 98.6% | 6.3% | 36.9% |
| Content of trisaturated triglyceride constituted only with C16 or more saturated fatty acids | 7.3% | 21.2% | 11.7% | 29.1% | 97.1% | 99.3% | 0.0% | 0.3% |
| Trans fatty acid content | 0.4% | 0.0% | 0.0% | 0.0% | 0.0% | 0.0% | 1.7% | 0.0% | each fat, ratio of the fat A to the fat B (fat A/fat B), and the content (% by mass) of the trisaturated triglyceride constituted only with the saturated fatty acid having 16 or more carbon atoms included in the mixed fats prepared are shown in Table 2 below.

Evaluation of Crystallinity

After the fats of Example 1 to Example 6, and Comparative Example 1 to Comparative Example 4 were completely lysed, respectively, at a temperature of no lower than 70° C., each 2 g portion was weighed on a dish having a diameter of 9 cm, and left to stand at 60° C. for 30 min. Thereafter, the dishes were placed in a refrigerator at 5° C., and in a temperature cycle-controlled chamber in which the temperature is switched between 5° C. and 20° C. every 12 hours, respectively. The change of the state was visually observed over time, and the results are shown in Table 2. The observation was carried out according to the following standards.
Standards of Observation
  A: favorable state
  B: state in which several number of granular crystals are found on the dish
  C: state in which granular crystals are found over the entire dish As the fat C, a soybean oil (C-3), a mixed oil of a soybean oil and a coconut hydrogenated oil (C-4), or a mixed oil of a soybean oil, a coconut hydrogenated oil and a cotton seed stearin (C-5) was used. Compositions of fat A-1 to A-5, fat B-1, and fat C-3 to C-5 are shown in Table 3 below.

Fat A-1: Palm Oil (trade name: Purified Palm Oil, manufactured by Nisshin OilliO Group, Ltd.)

Fat A-2: prepared by mixing a palm oil (trade name: Purified Palm Oil, manufactured by Nisshin OilliO Group, Ltd.), a palm mid fraction (iodine value: 45; manufactured by Nis-

TABLE 2

(unit: % by mass)

|  |  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Fat A | A-1 | 50% | 50% | 50% | 50% | 50% | 50% | 50% | 50% | 50% | 50% |
| Fat B and fat b | B-1 | 30% | 20% | 10% |  |  | 20% | 5% |  |  |  |
|  | B-2 |  |  |  | 10% |  |  |  |  |  |  |
|  | B-3 |  |  |  |  | 10% |  |  |  |  |  |
|  | b-1 |  |  |  |  |  |  |  | 10% |  |  |
|  | b-2 |  |  |  |  |  |  |  |  | 10% |  |
| Fat C | C-1 | 20% | 30% | 40% | 40% | 40% |  | 45% | 40% | 40% | 50% |
|  | C-2 |  |  |  |  |  | 30% |  |  |  |  |
| Fat A/fat B |  | 1.67 | 2.5 | 5 | 5 | 5 | 2.5 | 10 | — | — | 3.7% |
| Content of trisaturated triglyceride constituted only with saturated fatty acids having 16 or more carbon atoms |  | 10.0% | 7.9% | 5.8% | 4.8% | 6.6% | 4.9% | 4.7% | 13.4% | 13.7% | 3.7% |
| Day 5 | 5° C. | A | A | A | A | A | A | C | C | C | C |
|  | Cycle | A | A | A | A | A | A | B | C | C | C |
| Day 10 | 5° C. | A | A | A | A | A | A | C | C | C | C |
|  | Cycle | A | A | A | A | B | B | C | C | C | C |

As is clear from Table 2, in the case of the fats of Example 1 to Example 4 in which the ratio of fat A/fat B falls within the range of 0.5 to 5.5, and the content of the trisaturated triglyceride constituted only with the saturated fatty acid having 16 or more carbon atoms falls within the range of 4.5 to 10.5% by mass, granular crystal was not found even after 10 days, and kept favorable states. With regard to the fat of Example 5 in which the fat B-3 that is a transesterified oil having the ratio of lauric fat/palm-based fat being 3/7 was used, and the fat of Example 6 in which the fat C-2 that is a palm super olein was used, a small amount of granular crystals were found on day 10 after starting the control of temperature cycle, but a favorable state was exhibited at 5° C. without any granular crystals found. With regard to Comparative Example 1 in which the ratio of fat A/fat B was 10, i.e., exceeding 5.5, granular crystals were found in the entirety on day 10, revealing an unfavorable state. With regard to Comparative Example 2 and Comparative Example 3 in which palm highly hydrogenated oil (b-1) and soybean highly hydrogenated oil (b-2) were used, respectively, in place of the transesterified oil of lauric fat and palm-based fat, unfavorable since granular crystals were found in the entirety on day 5. Also with regard to Comparative Example 4 in which the fat B was not blended, unfavorable since granular crystals were found in the entirety on day 5.

Preparation of Fat A, Fat B and Fat C: 2

As fat A, in addition to the palm oil (A-1) described above, a mixed oil of a palm oil, a palm mid fraction and palm stearin (A-2), a mixed oil of a palm mid fraction and palm stearin (A-3), palm olein (A-4), or palm stearin (A-5) was used. As fat B, the aforementioned transesterified oil (B-1) was used.

shin OilliO Group, Ltd., in-company) and palm stearin (iodine value: 33; manufactured by Nisshin OilliO Group, Ltd., in-house) at a ratio of 36:48:16.

Fat A-3: prepared by mixing a palm mid fraction (iodine value: 45; manufactured by Nisshin OilliO Group, Ltd., in-house) and palm stearin (iodine value: 33; manufactured by Nisshin OilliO Group, Ltd., in-house) at a ratio of 75:25.

Fat A-4: Palm Olein (trade name: palm olein, iodine value: 56; manufactured by Nisshin OilliO Group, Ltd.)

Fat A-5: Palm Stearin (iodine value: 33; manufactured by Nisshin OilliO Group, Ltd., in-house).

Fat B-1: prepared by mixing a palm kernel highly hydrogenated oil (iodine value: less than 1; manufactured by Nisshin OilliO Group, Ltd., in-company) and a palm highly hydrogenated oil (trade name: Palm Highly Hydrogenated Oil; iodine value: less than 2; manufactured by Yokozeki Oil & Fat Ind. Co., Ltd.) at a ratio of 1:1, subjecting to random transesterification using sodium methoxide as a catalyst, followed by purification with a common procedure.

Fat C-3: soybean oil (trade name: Refined Soybean Oil, manufactured by Nisshin OilliO Group, Ltd.), melting point: lower than 5° C. (unmeasurable since it is not hardened, lower than 5° C. at least, since it is transparent at 5° C.)

Fat C-4: prepared by mixing a soybean oil (trade name: Refined Soybean Oil, manufactured by Nisshin OilliO Group, Ltd.) and a coconut hydrogenated oil (trade name: Coconut Hard 34, manufactured by Nisshin OilliO Group, Ltd.) at a ratio of 43:57. Melting point: 15° C.

Fat C-5: prepared by mixing a soybean oil (trade name: Refined Soybean Oil, manufactured by Nisshin OilliO Group, Ltd.), a coconut hydrogenated oil (trade name: Coconut Hard 34, manufactured by Nisshin OilliO Group, Ltd.) and cotton seed stearin (trade name: Cotton Seed Stearin, manufactured by Nisshin OilliO Group, Ltd.) at a ratio of 18:27:55. Melting point: 23° C.

TABLE 3

|  | fat A-1 | fat A-2 | fat A-3 | fat A-4 | fat A-5 | fat B-1 | fat C-3 | fat C-4 | fat C-5 |
|---|---|---|---|---|---|---|---|---|---|
| | | | | | | | | (unit: % by mass) | |
| Iodine value | 52.4 | 45.7 | 42.4 | 56.4 | 33.2 | 0.8 | 126.7 | 54.7 | 70.9 |
| Content of C12 and C14 saturated fatty acids | 1.4% | 1.3% | 1.2% | 1.2% | 1.4% | 30.8% | 0.0% | 36.4% | 17.6% |
| Content of C16 and C18 saturated fatty acids | 48.6% | 52.7% | 56.2% | 44.2% | 65.9% | 65.4% | 15.1% | 18.7% | 30.2% |
| Content of trisaturated triglyceride constituted only with C16 or more saturated fatty acids | 7.3% | 6.0% | 4.3% | 0.6% | 10.7% | 21.2% | 0.0% | 2.9% | 2.5% |
| Trans fatty acid content | 0.4% | 0.3% | 0.3% | 0.1% | 0.0% | 0.0% | 1.8% | 0.8% | 0.8% |

Preparation of Test Fat: 2

Example 7

A fat was prepared by mixing the fat A-1, the fat B-1 and the fat C-3 at a ratio of 45:12:43.

Example 8

A fat was prepared by mixing the fat A-1, the fat B-1 and the fat C-3 at a ratio of 45:28:27.

Example 9

A fat was prepared by mixing the fat A-2, the fat B-1 and the fat C-4 at a ratio of 54:10:36.

Example 10

A fat was prepared by mixing the fat A-3, the fat B-1 and the fat C-5 at a ratio of 35:10:55.

Comparative Example 5

A fat was prepared by mixing the fat A-4, the fat B-1 and the fat C-3 at a ratio of 45:12:43.

Comparative Example 6

A fat was prepared by mixing the fat A-5, the fat B-1 and the fat C-3 at a ratio of 45:28:27.

With respect to Example 7 to Example 10, and Comparative Example 5 to Comparative Example 6, blend proportions of each fat, ratio of the fat A to the fat B (fat A/fat B), and the content (% by mass) of the trisaturated triglyceride constituted only with the saturated fatty acid having 16 or more carbon atoms included in the mixed fats prepared are shown in Table 4 below.

Trial Production of Margarine, and Storage Test

Using the fats of Example 7 to Example 10, and Comparative Example 5 to Comparative Example 6, respectively, oil phases and aqueous phases were prepared according to the following blend compositions. Oil Phase (fat: 83.299%, emulsifying agent: 0.4%, flavor: 0.1%, β-carotene: 0.001%), and Aqueous Phase (water: 16.0%, common salt: 0.2%)

To the oil phase kept at about 70° C. was charged the aqueous phase while stirring to permit preliminary emulsification. After the preliminary emulsification for about 10 min, the mixture was fed into a bench combinator, it was passed through two cooling cylinders and one pin-machine, followed by quench kneading to obtain a margarine. Thus obtained margarine was left to stand in a warehouse without temperature control, and the change of the state was visually observed over time. In addition, with respect to the obtained margarine, the content of the trans fatty acid was measured, and the melt-in-the-mouth was evaluated. The results are shown in Table 4 below.

TABLE 4

| | | Example 7 | Example 8 | Example 9 | Example 10 | Comparative Example 5 | Comparative Example 6 |
|---|---|---|---|---|---|---|---|
| | | | | | | | (unit: % by mass) |
| Fat A | A-1 | 45% | 45% | | | | |
| | A-2 | | | 54% | | | |
| | A-3 | | | | 35% | | |
| | A-4 | | | | | 45% | |
| | A-5 | | | | | | 45% |
| Fat B | B-1 | 12% | 28% | 10% | 10% | 12% | 28% |
| | C-3 | 43% | 27% | | | 43% | 27% |
| | C-4 | | | 36% | | | |
| | C-5 | | | | 55% | | |
| Fat A/fat B | | 3.75 | 1.61 | 5.40 | 3.50 | 3.75 | 1.61 |
| Content of trisaturated triglyceride constituted only with saturated fatty acids having 16 or more carbon atoms | | 5.8% | 9.2% | 6.4% | 5.0% | 2.5% | 10.8% |
| Trans fatty acid content in margarine | | 1.1% | 0.8% | 0.5% | 0.7% | 1.0% | 0.6% |
| Melt-in-the-mouth | | favorable | not especial favorable | extremely favorable | extremely favorable | sticky and unfavorable | strongly waxy and bad |
| State of margarine texture | 3 months | favorable | favorable | favorable | favorable | grains of coarse crystal generated | texture being somewhat roughened |
| | 6 months | favorable | favorable | favorable | favorable | a large amount of grains of coarse crystal generated in the entirety | texture being extremely roughened and hardened |

As is clear from Table 4, in the case of the plastic fat compositions of Example 7 to Example 10 in which the ratio of fat A/fat B falls within the range of 0.5 to 5.5, and the content of the trisaturated triglyceride constituted only with the saturated fatty acid having 16 or more carbon atoms falls within the range of 4.5 to 10.5% by mass, favorable texture states were achieved also when they were processed into margarines. In addition, the margarine of Example 9 in which fat C-4 which is a mixed oil of a soybean oil, a vegetable oil that is in a liquid form at 5° C., and a coconut hydrogenated oil that is a lauric fat was used as the fat C; and the margarine of Example 10 in which fat C-5 which is a mixed oil of a soybean oil, a vegetable oil that is in a liquid form at 5° C., cotton seed stearin that is a stearin portion obtained in a fractionation step for obtaining the vegetable oil that is in a liquid form at 5° C., and a coconut hydrogenated oil that is a lauric fat was used as the fat C, both exhibited extremely favorable melt-in-the-mouth.

With regard to the plastic fat composition of Comparative Example 5 and Comparative Example 6 in which the ratio of fat A/fat B falls within the range of 0.5 to 5.5, but the content of the trisaturated triglyceride constituted only with the saturated fatty acid having 16 or more carbon atoms is less than 4.5% by mass or greater than 10.5% by mass, undesirable results were found when processed into margarines, revealing roughening of the texture, hardening of the texture, or generation of grains due to coarsening of the fat crystals in a time dependent manner. In addition, the obtained margarines exhibited inferior melt-in-the-mouth.

According to the present invention: a plastic fat composition having superior quality and a low content of trans fatty acids, in which roughening of the texture and generation of grains due to coarsening of the fat crystals are not caused even though a palm-based fat is used in a large amount; a margarine or a shortening in which the plastic fat composition is used; and a food in which the margarine or the shortening is used can be provided.

The invention claimed is:

1. A plastic fat composition comprising:
   fat A that is a palm-based fat having an iodine value of no greater than 62;
   fat B that is a transesterified oil containing 20 to 60% by mass of a saturated fatty acid having 12 to 14 carbon atoms, and 40 to 80% by mass of a saturated fatty acid having 16 to 18 carbon atoms based on the total fatty acids constituting the fat B; and
   fat C that is a vegetable oil other than the fat A, the fat C having a melting point of no higher than 25° C., wherein
   the fat A, the fat B and the fat C are in an oil phase,
   the ratio of the content of the fat A to the content of the fat B (fat A/fat B) ranges from 0.5 to 5.5, and
   the oil phase contains 4.5 to 10.0% by mass of a trisaturated triglyceride constituted only with a saturated fatty acid having 16 or more carbon atoms.

2. The plastic fat composition according to claim 1, wherein the fat A is a palm-based fat having a content of the trisaturated triglyceride constituted only with the saturated fatty acid having 16 or more carbon atoms being no greater than 9% by mass.

3. The plastic fat composition according to claim 1, wherein the fat B is obtained by transesterifying and hydrogenating a mixed oil of a lauric fat and a palm-based fat, and the fat B has an iodine value of no greater than 10.

4. The plastic fat composition according to claim 1, wherein the fat B is a fat obtained by transesterifying a lauric fat having an iodine value of no greater than 10 and a palm-based fat having an iodine value of no greater than 20, and the fat B has an iodine value of no greater than 17.

5. The plastic fat composition according to claim 1, wherein the fat C is a vegetable oil that is in a liquid form at 5° C., or a mixed oil of a vegetable oil that is in a liquid form at 5° C. and a stearin portion and/or a lauric fat obtained in a fractionation step for obtaining the vegetable oil that is in a liquid form at 5° C.; and
   the content of the fat C in the oil phase is 10 to 60% by mass.

6. The plastic fat composition according to claim 1, wherein the trans fatty acid content is no greater than 5% by mass.

7. The plastic fat composition according to claim 1, wherein the plastic fat composition is margarine or shortening.

8. A food wherein the plastic fat composition according to claim 7 is used.

* * * * *